Jan. 21, 1964  N. G. BELL  3,118,419
AUTO TRACK LAYING AND AMPHIBIOUS VEHICLE
Filed May 9, 1961  6 Sheets-Sheet 1
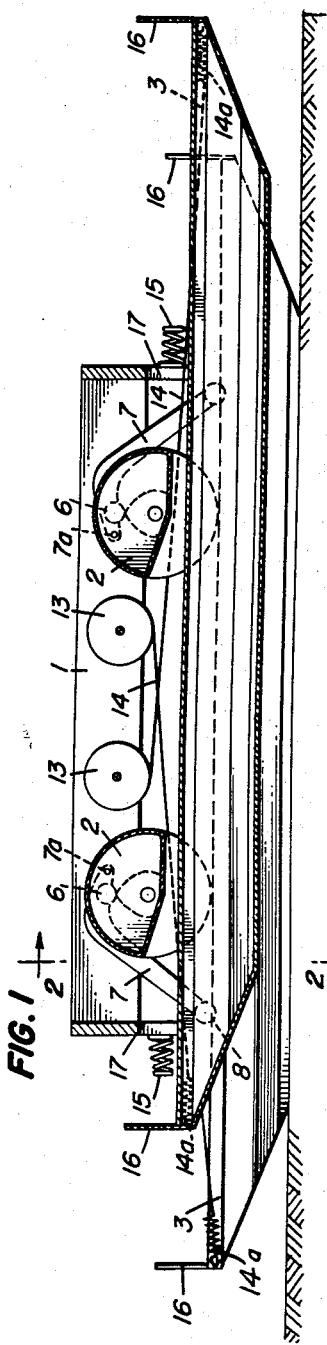
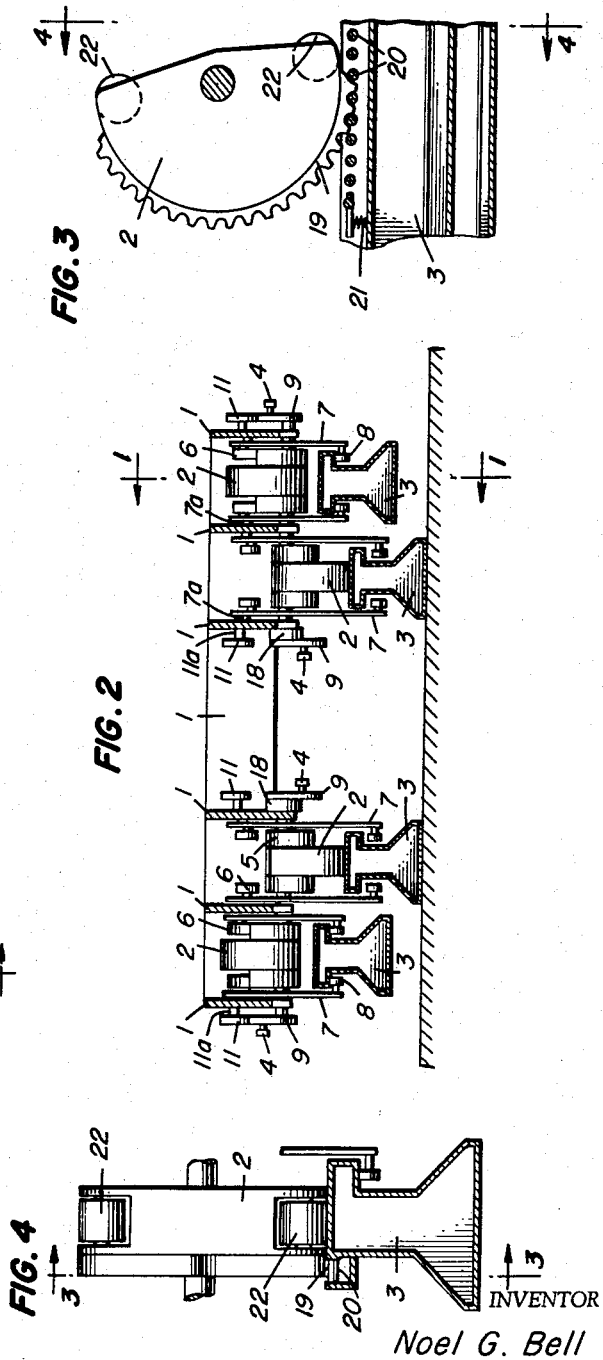
INVENTOR
Noel G. Bell
BY
ATTORNEY Jan. 21, 1964    N. G. BELL    3,118,419
AUTO TRACK LAYING AND AMPHIBIOUS VEHICLE
Filed May 9, 1961    6 Sheets-Sheet 2

INVENTOR
*Noel G. Bell*

BY
ATTORNEY

Jan. 21, 1964  N. G. BELL  3,118,419
AUTO TRACK LAYING AND AMPHIBIOUS VEHICLE
Filed May 9, 1961  6 Sheets-Sheet 3
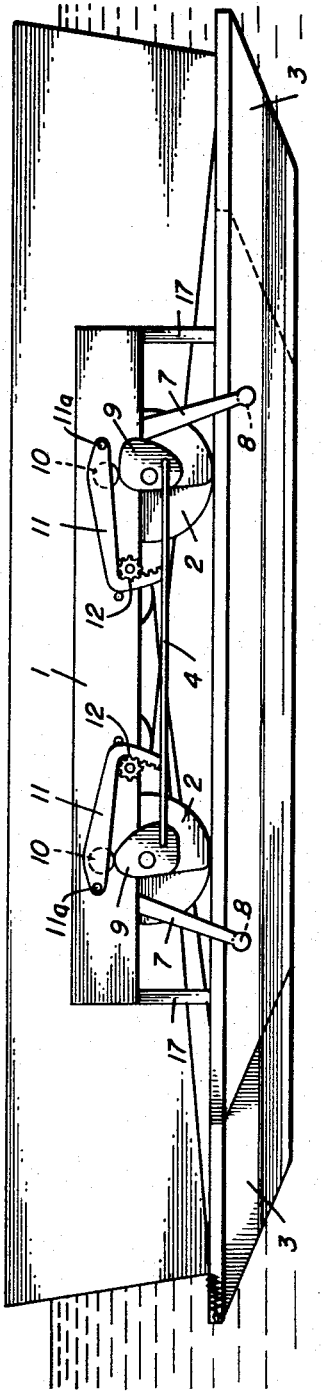
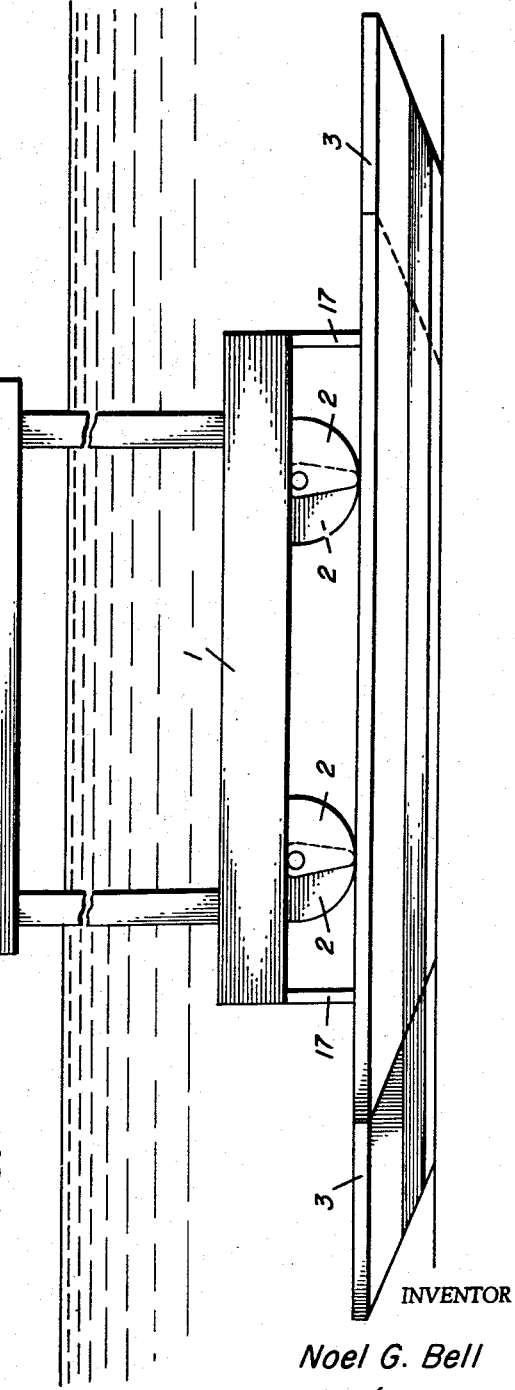
INVENTOR
Noel G. Bell
BY
ATTORNEY

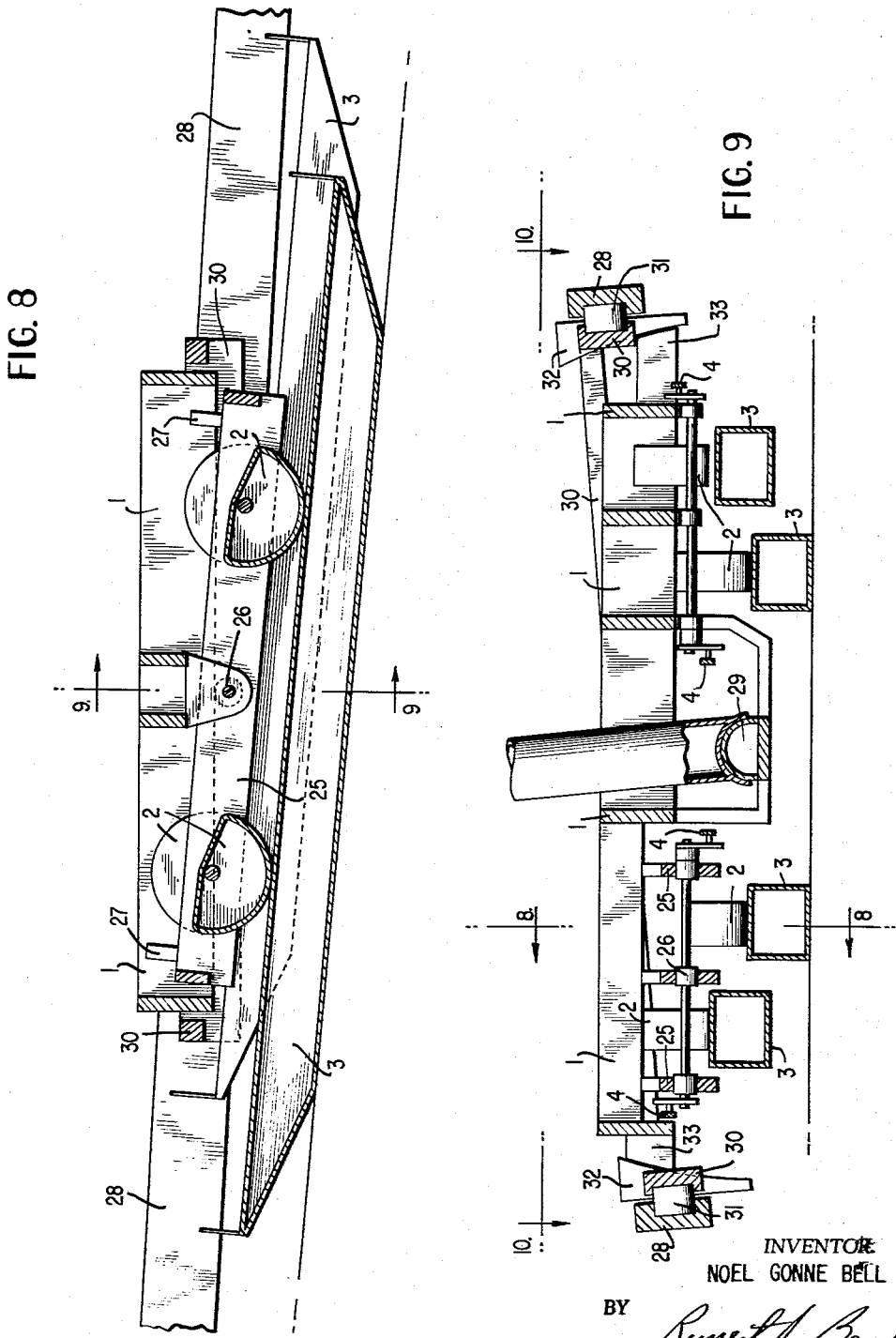

Jan. 21, 1964 N. G. BELL 3,118,419
AUTO TRACK LAYING AND AMPHIBIOUS VEHICLE
Filed May 9, 1961 6 Sheets-Sheet 5

INVENTOR.
NOEL GONNE BELL
BY
ATTORNEY

Jan. 21, 1964  N. G. BELL  3,118,419
AUTO TRACK LAYING AND AMPHIBIOUS VEHICLE
Filed May 9, 1961  6 Sheets-Sheet 6
FIG. 11
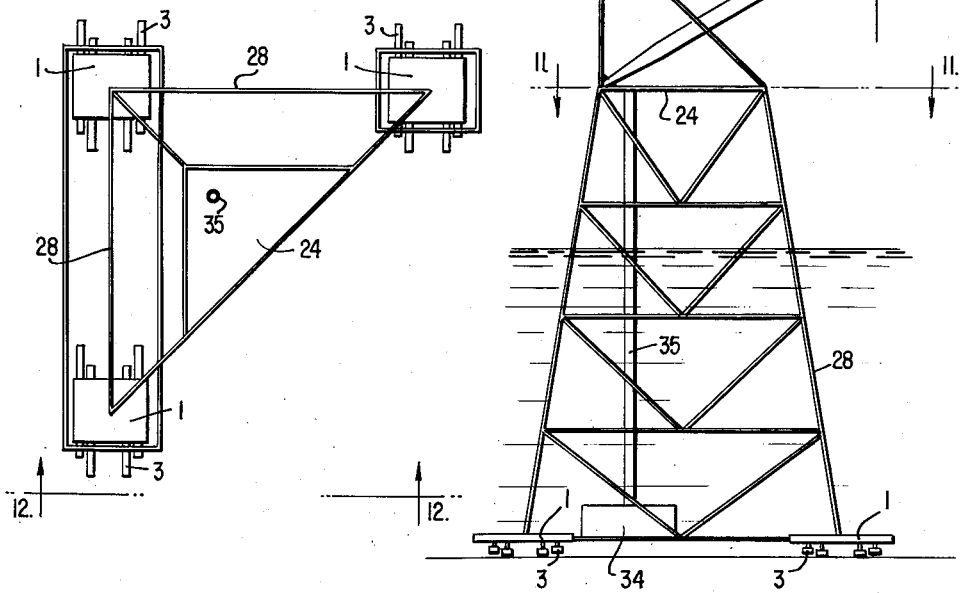
FIG. 12
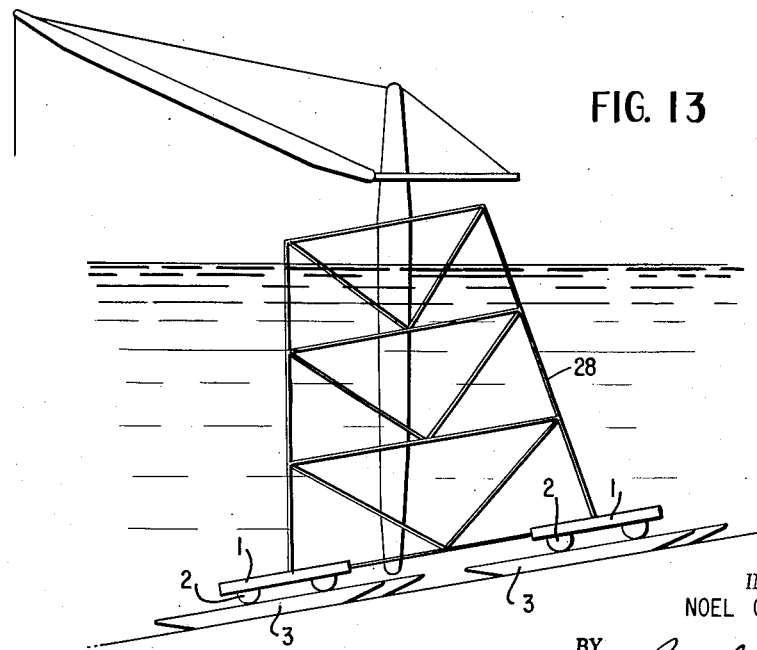
FIG. 13
INVENTOR.
NOEL GONNE BELL
BY
*Rupert J. Brady*
ATTORNEY United States Patent Office 3,118,419
Patented Jan. 21, 1964

3,118,419
AUTO TRACK LAYING AND AMPHIBIOUS
VEHICLE
Noel Gonne Bell, 510 Lincoln Blvd.,
Santa Monica, Calif.
Filed May 9, 1961, Ser. No. 108,850
6 Claims. (Cl. 115—1)

This invention refers to auto track laying and amphibious vehicles, and this application is a continuation-in-part of my copending application Serial No. 737,553, filed May 26, 1958, for Auto Track Laying and Amphibious Vehicles, now U.S. Patent 3,034,591, and my copending application Serial No. 26,872, filed May 4, 1960, with the same title, now abandoned.

The invention provides a vehicle of the type that has pairs of wheel segments journaled on opposite sides of a frame, the pairs of wheel segments rolling on individual ground bearing track beams such as hollow pontoons, or the like, the wheel segments being not less than a semi-circle, and each pair being mounted at opposite angular positions to each other, so that while one wheel segment is rolling on a track beam, the opposite wheel segment is out of contact with its track beam and allows the latter to be raised and moved forward with the vehicle to roll forward on it in turn. Such a vehicle was disclosed and described in my copending application Serial No. 737,553, now Patent 3,034,591, but the structure disclosed therein did not provide for simultaneous full bearing of the four supporting wheel segments on the track beams when traversing rough or uneven terrain. The present invention provides structure whereby the pairs of wheel segments on one side of the main frame are journaled within an individual frame member which, in turn, is pivotally mounted within the main frame member on which the opposite pairs of wheel segments are journaled, at the opposite side thereof. Thus this new structure removes stresses from the vehicle frame which were present in the frame member of the vehicle described in application Serial No. 737,553, as the vehicle traversed uneven ground.

The main object of the present invention is to provide a construction of auto track laying and amphibious vehicle which provides simultaneous full bearing of the actively engaging wheel segments on the track beams, to avoid strain and stresses on the vehicle frame.

Another object of the invention is to provide a construction for auto track laying and ambious vehicles with a three-point support system.

Still another object of the invention is to provide a construction of auto track laying and amphibious vehicle which travels on the ground under water, and which is capable of providing positive three-point support irrespective of the unevenness of the ground.

A further object of my invention is to provide a construction of auto track laying and amphibious vehicle which can be used in connection with a number of such vehicles, or groups of vehicles, joined together in a frame to support and transport a platform, tower, or the like, the vehicles having slight freedom of movement in several planes with respect to each other and to the frame to conform to the contour of the ground.

Other and further objects of the invention will become apparent while referring to the specification and drawings hereinafter following, in which:

FIG. 1 is a longitudinal section of a vehicle in the plane 1—1 of FIGS. 2 and 5;

FIG. 2 is a cross section in the plane 2—2 of FIGS. 1 and 5;

FIG. 3 is an enlarged view of a detail in the plane 3—3 of FIG. 4;

FIG. 4 is an enlarged view of the detail in the plane 4—4 of FIG. 3;

FIG. 6 is a side elevation of a vehicle similar to that shown in FIGS. 1, 2 and 3, but with the track beams in a different position and the hull of a boat mounted on the frame;

FIG. 7 is a side elevation of a vehicle similar to that shown in FIG. 6 but with a platform on the frame substituted for the hull of a boat, and having the means for raising and moving the tracks omitted;

FIG. 8 is a longitudinal section of a vehicle in the plane 8—8 of FIGS. 9 and 10, parts shown in FIGS. 1-5 for simplicity;

FIG. 9 is a cross section in the plane 9—9 of FIGS. 8 and 10 with certain parts, as shown in FIG. 5, omitted for simplicity;

FIG. 11 is a plan of a tower in the plane 11—11 of FIG. 12;

FIG. 12 is an elevation in the plane 12—12 of FIG. 11; and

FIG. 13 is a side elevation of another tower.

Figure 5:
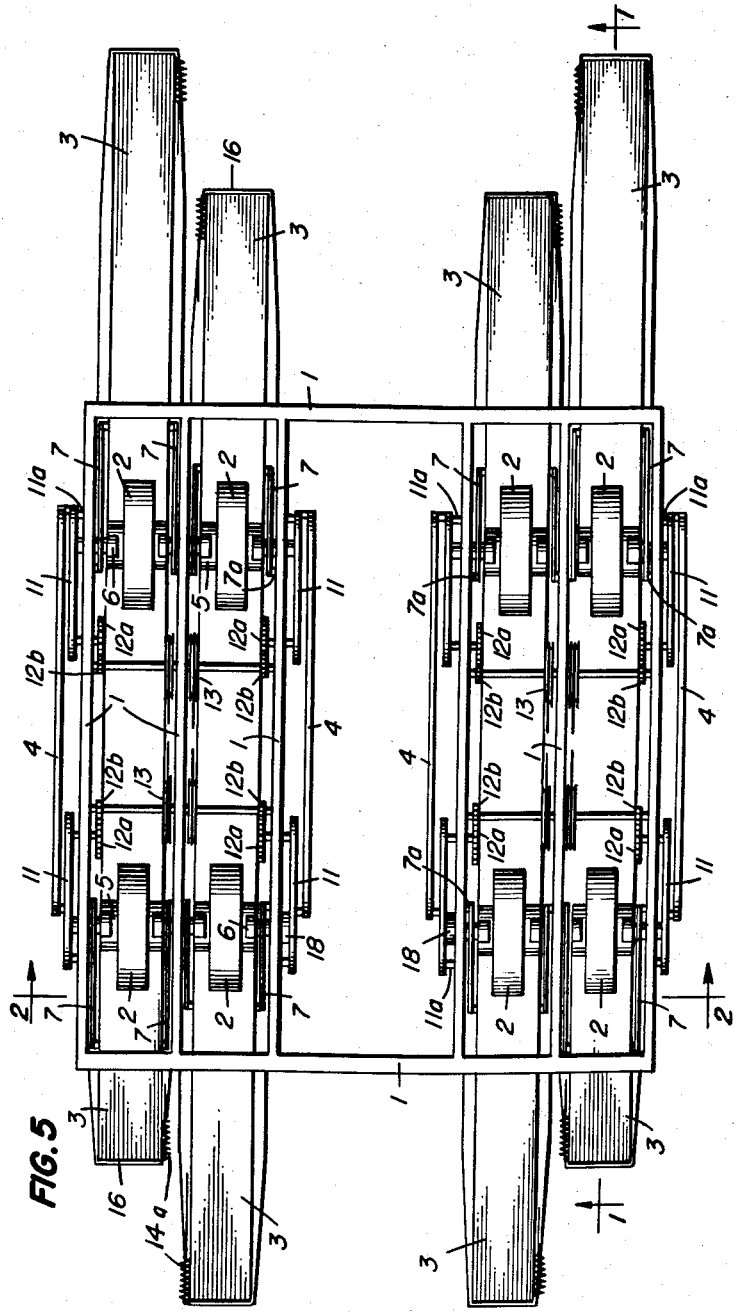
FIG. 5 is a plan of the vehicle in FIGS. 1 and 2.

The vehicle shown in FIGS. 1-7 is the vehicle shown and described in my copending application Serial No. 737,553, now U.S. Patent 3,034,591, and these figures show the detailed operating parts which are common to the vehicle of the present invention. The invention of the present disclosure, which is an improvement of the vehicle shown in FIGS. 1-7, is illustrated in FIGS. 8-13, and for purposes of simplicity and clarity in the drawings many of the operating parts of the vehicle shown in FIGS. 1-7 have been omitted from the vehicle shown in FIGS. 8-10; but it is to be understood that all of the mechanism, such as the hollow pontoon guide and lifting members; the cam actuators; the pontoon cable and drum advancing mechanism; the resiliently mounted pontoon racks; the sprocket wheels connected with the wheel segments for engaging the pontoon toothed racks; etc., shown in FIGS. 1-7, are to be included by reference in FIGS. 8-10. The reason for omitting these various mechanisms from FIGS. 8-10 will become apparent during the course of the specification hereinafter following.

As shown in FIGS. 1, 2 and 5, the vehicle comprises a frame 1 with two pairs of wheel segments or half wheels 2 (hereinafter referred to as half wheels) and one pair of ground bearing track beams, buoyant pontoon track members, or stepper pontoons 3 arranged on each side of the vehicle. Each half wheel is offset laterally from the other member of the pair and mounted at an opposite angular position to it on the same axle so that the pair makes up the profile of a complete wheel. The outer half wheels on each side are in longitudinal alignment and are maintained in the same angular phase by a connecting rod 4, and correspondingly the inner half wheels. There is a track beam 3 under each two outer or inner half wheels. Thus, while the vehicle is rolling forward (for a distance of half a wheel circumference) on one set of outer, or inner, half wheels on a track beam the other set of opposed half wheels is out of contact with its track beam and allows it to be raised and moved forward for the vehicle to roll forward on it in turn.

The ground bearing track beams 3 are made hollow as illustrated to add to the buoyancy of the vehicle when it is used amphibiously, and also to make the tracks lighter and to prevent dirt weighing down on the tracks when the vehicle is used on soft ground.

One example of means of raising and moving the tracks 3 by means of cams, levers, rollers and gears, is illustrated. Cams 5 raise rollers 6 on pairs of levers 7 which are pivotally mounted on the frame at 7a, and rollers 8 on the ends of the levers guide the tracks and assist in raising the tracks when necessary. At the same time, as shown in FIG. 6, a cam 9 raises a roller 10 on a right angled lever 11, with gear teeth, which is pivotally mounted on the frame at 11a, the right angled lever thus turns gears 12, 12a, 12b, to rotate a wheel 13 to which one end of a cable 14 is attached whose other end is connected to the track and pulls it ahead, the sizes of the gears, 12, 12a, 12b and the wheel 13 being proportioned so as to give the required travel of the track.

To absorb and store the energy of the momentum of the track, spring means 14a may be interposed at the end of the cable 14; also, a shock absorber or spring means 15 may be placed on the frame to engage a stop 16 on the track. These springs may be adjustable to suit varying speeds. A spring may be attached to the quadrant 11 to prevent slack in the cable 14.

Vertical roller guides 17 are mounted on the frame 1 to maintain the tracks 3 in longitudinal alignment. Gear or sprocket wheels 18 are illustrated for attaching a power drive from an engine, not shown, mounted on the frame.

In order to prevent the half wheels slipping on the tracks when on an incline or turning, the contacting surface may be made rough or, as shown in FIGS. 3 and 4, a sprocket wheel 19 may be mounted beside the half wheel 2 to engage a rack 20 on the track, the rack being supported on springs 21 just strong enough to hold its weight.

Preferably, as shown in FIG. 3, the wheel segments are made slightly greater than a semi-circle to allow sufficient area of full bearing of their ends when both of the pair of segments are in contact with their tracks at the same time, and also to allow for wear on the ends of the segments.

As shown in FIGS. 3 and 4, rollers 22 are mounted on the wheel segments tangential to their circumferential ends. These allow for full bearing area at the ends of the half wheels, if segments just equal to a semi-circle are used, and also allow the end of the segment to roll on the track when the track is on rising ground.

Figure 10:
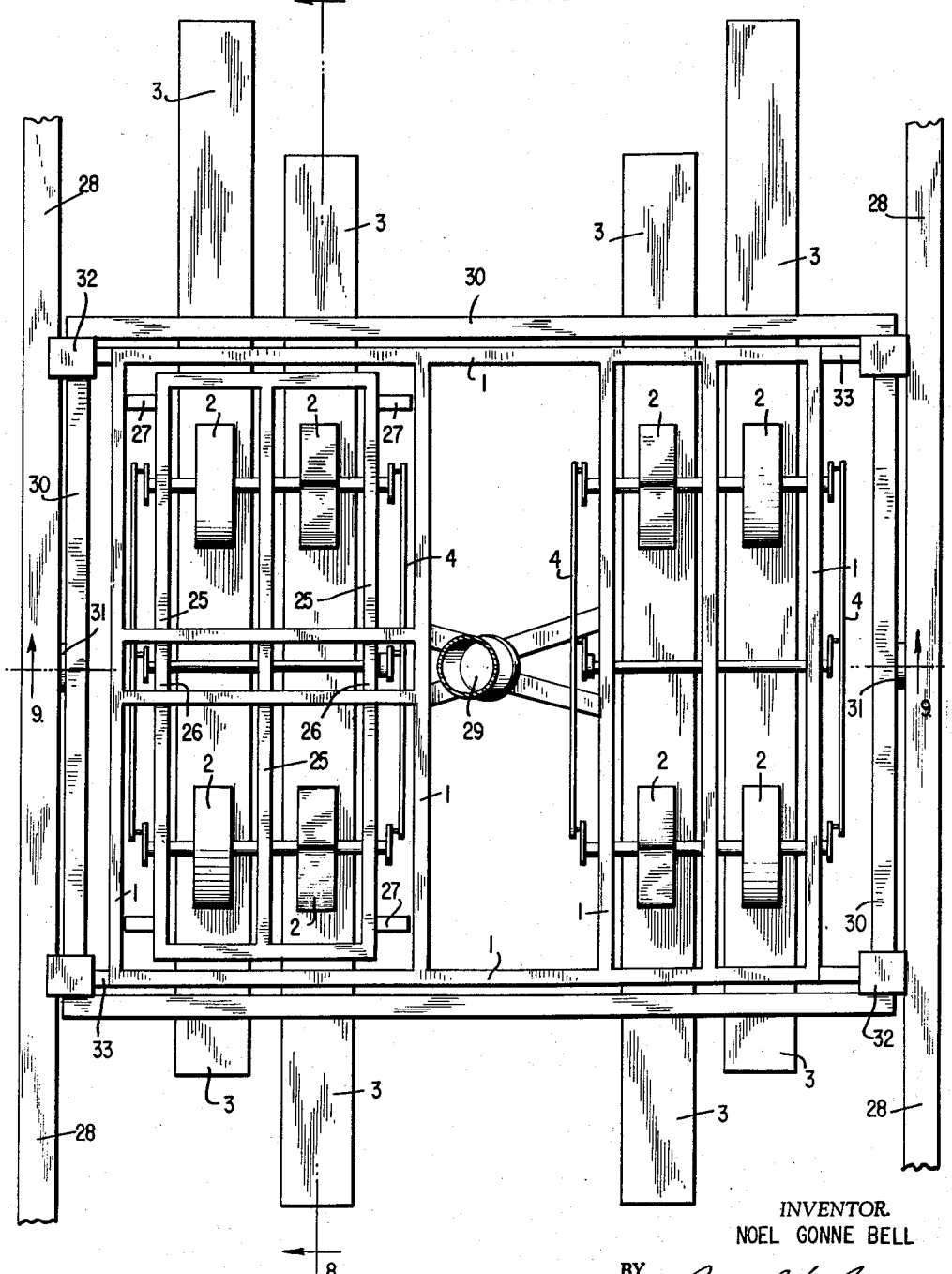
FIG. 10 is a plan in the plane 10—10 of FIG. 9.

As shown in FIGS. 8, 9 and 10 which illustrate the vehicle structure of the present invention, an auxiliary frame 25 carries the tandem wheel segments 2 on one side of the vehicle and is connected at its center by a pin joint 26 to the main frame 1. The tandem wheel segments on one side of the vehicle are thus journaled for rotational movement to the frame 25 rather than the frame 1 as in FIGS. 1–7. Guide means 27 on the frame 25 keep the frame in longitudinal alignment with the frame 1 as it pivots about its pin point 26. Thus four wheel segments have full bearing simultaneously on the track beams 3. With the structure shown in FIGS. 1–7, if the ground is very uneven only three wheel segments would have simultaneous full bearing on the track beams, and the structure of the present invention provides all four wheel segments to have simultaneous full bearing even on uneven ground.

When the vehicle traverses uneven ground the pontoon track beams tend to lay against the surface of the ground. With the old structure of FIGS. 1–7, if the front of one track beam was sloping downwardly, while the other was upwardly sloping or level, only one of the wheel segments on that side of the vehicle would be in bearing contact with the beam. With the structure of this invention, since the wheel segments on one side of the machine are mounted in a frame which pivots with respect to the rest of the vehicle, the frame 25 will pivot about joint 26, with respect to frame 1, so that both wheel segments on that side of the machine will be in full bearing contact with the track beam irrespective of its attitude with respect to the other track beam. This construction also relieves stresses from the vehicle frame 1 which were present in the vehicle of FIGS. 1–7.

Some cross beams required on frame 1 for better distribution of loads are omitted for clarity.

The track beams 3 may be raised and moved by cams and levers, as previously described in connection with FIGS. 1–7, and as previously stated it is to be understood that the mechanisms for performing these functions are included on FIGS. 8–10 by reference. Alternatively, the tracks may be moved forward by attaching the cable 14 to the front end of the track and pulling the cable forward over a pulley mounted on a bracket on the front of the frame 1. The track raising gear may be omitted and, in the case of underwater operation, the hollow track will be raised by its own buoyancy.

As shown in FIGS. 8–13, a number of vehicles may be connected together to support a tower, for example a triangular frame 28 consisting of vertical and inclined posts and cross braces. The bottom of each post is supported by a vehicle by means of a universal joint, for example a ball and socket joint 29 coupled to frame 1. The frame 1 of the vehicle thus has some freedom of movement relative to the triangular frame 28 but is maintained in longitudinal alignment with it by means of an additional frame 30 which is connected on its centerline to the triangular frame 28 by pin joints 31 that allow the additional frame 30 some freedom of vertical rotation. Thus the outer frame 30 is journaled at 31 to frame 28 and the inner frame 1 is coupled to the frame 28 through the ball and socket joint 29. Curved guide members 32 on the corners of the frame 30 engage guide members 33 on the frame 1 to keep frame 1 in relative alignment with frame 30. Of course, two or more vehicles may be connected to the bottom of each post to afford greater ground bearing area, if desired.

The framing construction of the vehicle shown in FIGS. 8–10 thus provide a gimbaled type supporting system. The vehicle has some relative movement to the structure, or object it supports, and at all times has simultaneous full bearing of all four of its wheel segments on the track members, even when it is traversing uneven ground.

The framing of the vehicles and tower may be hollow and water-tight, for example, tubular, and as shown in FIG. 12 water-tight chambers 34 are formed at the bottom of the tower 28 to afford sufficient buoyancy to float the structure. These are partially flooded when the tower is resting on the bottom to give slight negative buoyancy so that it will not float, and in this state the water-tight tubular tower structure members provide buoyancy almost equal to the deadweight of the tower structure. When a crane or material is placed on the tower, the live load (and counterweight if movable of crane) is supported by the bearing area of the ground under the track beams. Thus, with this arrangement the ground under the track beams has in effect only to support the live load placed on the tower. The buoyancy may be controlled to reduce the pressure on the ground when the latter is soft.

To give a low center of gravity, the buoyancy compartments 34 may house the actuating machinery and fuel, and so forth, and an access shaft 35 or shafts leading to the platform 24 above water level may be provided. Thus the tower may be operated from the engine room or by controls on the platform above water level. The access shafts may be flexibly connected to the compartments so that they can be kept plumb automatically if desired. Exhaust and air ducts may be placed in the access shafts when internal combustion engines are used.

A tower as described is particularly suitable for underwater work as shown in FIG. 7, which shows a vehicle of the type described supporting a platform above water level.

The following are some features which may be utilized with the basic structure of the invention:

Bulldozer blades may be mounted on the vehicles to level off the ground. The blades and arms may be hollow to have buoyancy almost equal to their weight.

The platform above water level may be of open grid construction for less resistance to wave action, with temporary covers if necessary.

The legs of the tower may be telescopic for leveling.

A crane may be mounted on the tower as shown in FIGS. 12 and 13. That shown in FIG. 13 may have a ball and socket support at its foot, and a gimbal arrangement at the platform so that the mast may be kept vertical automatically. The counterweight may be mounted on ropes and pulleys for lowering it to the bottom of the tower when the tower is floated to the surface.

For ease in turning the tower, the buoyancy may be increased on one side by suitably arranged chambers 34.

Anchors with mooring buoys may be set to control the tower when sinking or floating it.

Anchors may also be used for pulling the tower when in mud too soft for traction.

A floating fender boom may be anchored alongside the tower for mooring tugs and supply vessels.

High pressure jets for water or chemicals may be provided for cleaning mud and marine life off tracks and wheel segments and so forth.

Windows for observation together with lights, television cameras, and arms with mechanical hands, may be provided for doing work under water.

Mats may be used under the tracks for extra bearing if the tower has to be walked ashore.

The track beams may be made of hollow tubes with plates on the sides, and the wheel segments may be concave, to allow freedom of slight lateral rotation for the tracks.

Other vehicles, for example, with endless tracks or balloon tires, may be used to support the said towers where suitable.

For submarine pipe laying, for example offshore oil and gas pipe lines, a number of towers may be used with bridges suspended between them to support the pipe line and laying equipment. Movable conveyor belts may be mounted on the bridges and arranged to move backwards at the same rate that the towers move forward so that an operator working on the pipe, say jointing, is stationary relative to the pipe. A plow may be attached to one of the towers to excavate a trench just ahead of the pipe and a scraper may be mounted behind the pipe to backfill the trench.

For laying large individual pipes under water, for example sewer outfalls, the pipe may be placed in a cage which rides on guide rails down the face of the tower, the pipe being then moved into final position.

The towers may be used for construction of tunners in trench under water, for example vehicular tunnels. The trench may be excavated ahead by a wheel or chain bucket excavator mounted on a tower. The tower may be constructed to allow a pair of the vehicles supporting it to ride in the trench while the third vehicle rides on the higher ground, a telescopic arrangement allowing the level of the third vehicle to be carried. This tower may support one end of the tunnel segment while it is lowered to the bottom and a second tower with a wide base spanning the sloping sides of the trench may be employed to support the other end.

For use as a suction dredge, the pumps may be mounted at the bottom of the tower. A pair of suction pipes may be mounted in the front at the bottom of the tower, one on each side of the centerline. One end of each pipe is connected by a flexible joint to the pump inlet and the open ends can be swung in corresponding horizontal arcs from the centerline towards each side. The flexible joint also allows the open ends of the pipes to be swung up above water level for inspection and maintenance. The suction pipes may be of hollow double wall construction to give buoyancy almost equal to their weight. The discharge pipe may be a normal floating pipe line, or it may be carried by a truss which is supported by another tower, or several towers and trusses may be used to reach the point of discharge. The towers supporting the trusses can travel at the same speed as the dredge tower. Where desirable the discharge pipe can be kept below water level, just clear of the bottom. Other known dredging methods may be employed in conjunction with the towers. An excavating wheel or chain bucket may be mounted on one end of a boom whose other end is hinged at the top of the tower, so that the excavator can be raised out of the water for inspection and repairs.

Of course the auxiliary and additional frames described may have their shapes modified while still achieving the desired results.

While I have described my invention in one of its preferred embodiments, I realize that modifications can be made and I desire that it be understood that no limitations upon my invention are intended other than may be imposed by the scope of the appended claims.

What I claim as new and desire to secure by Letters Patent of the United States is as follows:

1. A stepper type vehicle for operation under water on a river bed or the like comprising, a main supporting frame, an auxiliary supporting frame mounted for pivotal movement along one side of and within said main supporting frame, tandem pairs of substantially semicircular wheel segments mounted for rotation in said auxiliary supporting frame, tandem pairs of substantially semicircular wheel segments mounted for rotation on the side of said main frame opposite the auxiliary supporting frame, the wheel segments of each pair disposed in side-by-side spaced relation and oppositely arranged circumferentially so that one wheel segment of each pair is active while the other wheel segment is inactive, pairs of hollow elongated buoyant stepper pontoons having substantial vertical depth underlying said tandem pairs of wheel segments on each side of the main frame and adapted to be elevated and shifted longitudinally for moving the vehicle with a stepping action, rotary cam and linkage means associated with the pairs of wheel segments and having lifting engagement with said stepper pontoons near the forward and rear ends of the latter and operable upon rotation of the wheel segments to lift one of each pair of stepper pontoons and advance it longitudinally, the second of each pair of stepper pontoons then resting upon the river bed and supporting said frames and being engaged by the active wheel segments of said pairs.

2. A stepper type vehicle for operation under water on a river bed or the like comprising, a main supporting frame, an auxiliary supporting frame mounted for pivotal movement along one side of and within said main supporting frame, tandem pairs of substantially semicircular wheel segments mounted for rotation in said auxiliary supporting frame, tandem pairs of substantially semicircular wheel segments mounted for rotation on the side of said main frame opposite the auxiliary supporting frame, the wheel segments of each pair disposed in side-by-side spaced relation and oppositely arranged circumferentially so that one wheel segment of each pair is active while the other wheel segment is inactive, pairs of hollow elongated buoyant stepper pontoons having substantial vertical depth underlying said tandem pairs of wheel segments on each side of the main frame and adapted to be elevated and shifted longitudinally for moving the vehicle with a stepping action, rotary cam and linkage means associated with the pairs of wheel segments and having lifting engagement with said stepper pontoons near the forward and rear ends of the latter and operable upon rotation of the wheel segments to lift one of each pair of stepper pontoons and advance it longitudinally, the second of each pair of stepper pontoons then resting upon the river bed and supporting said frames and being engaged by the active wheel segments of said pairs, resilient interengaging toothed means on the peripheries of the wheel segments and the tops of the said stepper pontoons to prevent slippage of the wheel segments on the pontoons when the wheel segments are actively engaging the stepper pontoons.

3. A moving ground-engaging vehicle capable of operating under water on a river bed or the like or on dry ground, said vehicle of the type which successively lays and advances the track members on which it travels in progressive motion and comprising, a main supporting frame, a secondary supporting frame pivotally mounted along one side of and within the main supporting frame, tandem pairs of substantially semicircular wheel segments mounted for rotation on said secondary supporting frame, tandem pairs of substantially semi-circular wheel segments mounted for rotation on the side of said main supporting frame opposite the secondary frame, pairs of elongated buoyant pontoon track members underlying said tandem pairs of wheel segments on the secondary supporting frame and the main supporting frame and adapted to be advanced longitudinally for moving the vehicle, the wheel segments of each pair disposed in side-by-side spaced relation and oppositely arranged circumferentially so that one wheel segments of each pair is rolling on a pontoon track member while the other wheel segment is out of engagement with its underlying pontoon track member, said buoyant pontoon track members having substantial vertical depth to maintain the wheel segments above the soft mud of a river bed or the like, movable means connected with the pairs of wheel segments and engaging said pontoon track members and operable upon rotation of the wheel segments to forwardly advance one of each pair of said pontoon track members, the second of each pair of pontoon track members then resting upon the ground and supporting said frames and being engaged by the wheel segments of said pairs rolling on it.

4. A moving ground-engaging vehicle capable of operating under water on a river bed or the like or on dry ground, said vehicle of the type which successively lays and advances the track members on which it travels in progressive motion and comprising a main supporting frame, a secondary supporting frame pivotally mounted along one side of and within the main supporting frame, tandem pairs of substantially semicircular wheel segments mounted for rotation on said secondary supporting frame, tandem pairs of substantially semicircular wheel segments mounted for rotation on the side of said main supporting frame opposite the secondary frame, pairs of elongated buoyant pontoon track members underlying said tandem pairs of wheel segments on the secondary supporting frame and the main supporting frame and adapted to be advanced longitudinally for moving the vehicle, the wheel segments of each pair disposed in side-by-side spaced relation and oppositely arranged circumferentially so that one wheel segment of each pair is rolling on a pontoon track member while the other wheel segment is out of engagement with its underlying pontoon track member, said buoyant pontoon track members having substantial vertical depth to maintain the wheel segments above the soft mud of a river bed or the like, movable means connected with the pairs of wheel segments and engaging said pontoon track members and operable upon rotation of the wheel segments to forwardly advance one of each pair of said pontoon track members, the second of each pair of pontoon track members then resting upon the ground and supporting said frames and being engaged by the wheel segments of said pairs rolling on it, sprocket wheel means connected with the wheel segments, and toothed racks resiliently mounted upon the said pontoon track members to permit free engagement with said sprocket wheel means and to prevent fracture of the teeth of the sprocket wheel means, and said resiliently mounted toothed racks positively engaging the sprocket wheel means to prevent slippage of the latter on the pontoon track members when the wheel segments are rolling on such members.

5. A track laying and amphibious vehicle comprising a frame, tandem pairs of wheel segments on each side of the frame, each pair of wheel segments being mounted at opposite angular positions to each other, and a buoyant pontoon track beam extending longitudinally under each pair of tandem wheel segments, whereby while the load of the vehicle is carried by the track beams under one set of wheel segments the track beams under the opposite wheel segments are not under load and may be moved forward, an auxiliary frame pivotally connected to said first mentioned frame and having the tandem wheel segments on one side of the frame connected thereto with the tandem wheel segments on the other side of said frame connected to said first mentioned frame to provide full bearing for four wheel segments simultaneously, and means for moving the track beams connected to said frame and said auxiliary frame.

6. A device of the character described including a main frame, a plurality of secondary frame members pivotally connected within and to said main frame, a vehicle as set forth in claim 5 connected within each of said plurality of secondary frame members, the frame of each vehicle connected for pivotal movement about an axis normal to the pivot axis of the secondary frame member whereby said plurality of secondary frame members keep the vehicle in longitudinal alignment in the direction of travel of said main frame.

References Cited in the file of this patent

UNITED STATES PATENTS

| | | |
|---|---|---|
| 1,692,121 | Holmes | Nov. 20, 1928 |
| 2,693,162 | Poche | Nov. 2, 1954 |
| 2,895,300 | Hayward | July 21, 1959 |